United States Patent [19]

Walker

[11] Patent Number: 4,606,386

[45] Date of Patent: Aug. 19, 1986

[54] UNIVERSAL PROFILING MACHINE

[76] Inventor: Carl R. Walker, 6308 Millcreek La., Knoxville, Tenn. 37921

[21] Appl. No.: 545,665

[22] Filed: Oct. 26, 1983

[51] Int. Cl.[4] .......................... B23C 1/18; B23C 5/10
[52] U.S. Cl. .............................. 144/134 B; 409/220; 409/224; 144/2 R; 144/134 A; 144/137; 144/145 A
[58] Field of Search ............... 409/130, 182, 220, 221, 409/224, 227, 225, 219; 144/3 R, 2 R, 145 R, 145 A, 134 A, 134 B, 137

[56] References Cited

U.S. PATENT DOCUMENTS

| | | | |
|---|---|---|---|
| 3,880,048 | 4/1975 | Zimmerman | 144/145 A |
| 4,241,771 | 12/1980 | Rhodes et al. | 144/145 A |
| 4,305,439 | 12/1981 | Skinner | 144/134 A |
| 4,450,882 | 5/1984 | Hitchcock et al. | 144/145 A |

Primary Examiner—W. D. Bray
Attorney, Agent, or Firm—Pitts and Brittian

[57] ABSTRACT

A universal profiling apparatus (10) is provided which has a work engaging member (20) which produces repetitive patterns on a work piece (18). The device includes a frame (12) and a work carrying means (16) mounted thereon, which carries the work piece (18) during the apparatus operation. This work carrying means (16) is rotated about a preselected axis with respect to the table itself. The work engaging member (20) is reciprocated along a preselected path while the work engaging member contacts the work piece. The work carrying means (16) can also be reciprocated. Each of these procedures can be performed manually or automatically. During the automatic mode of operation the movement of the work carrying means (16) and the work engaging member is synchronized for preselected and desired patterns in the work piece. These patterns may be of a one, two or three dimensional configuration.

21 Claims, 20 Drawing Figures

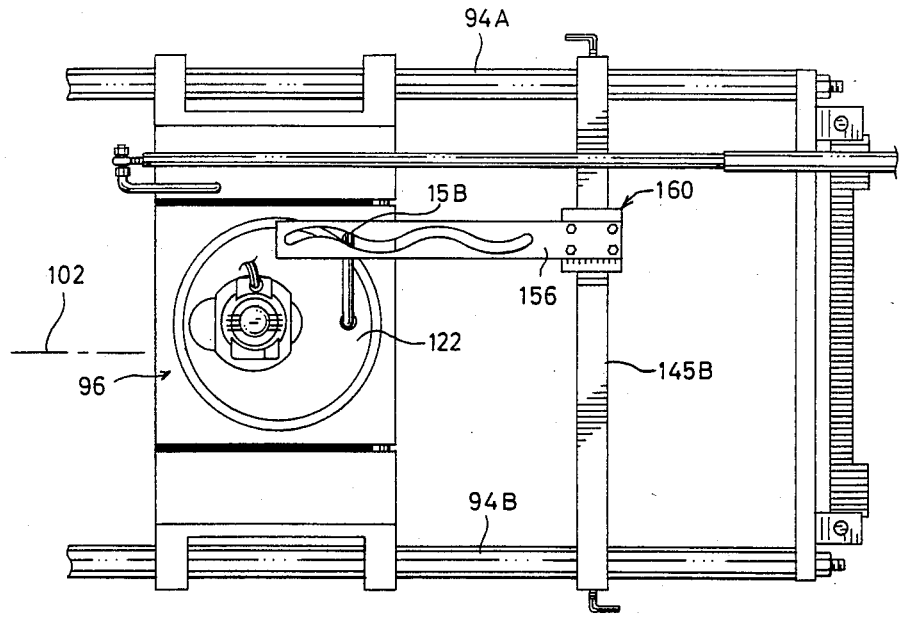
FIG. 8A
FIG. 8B
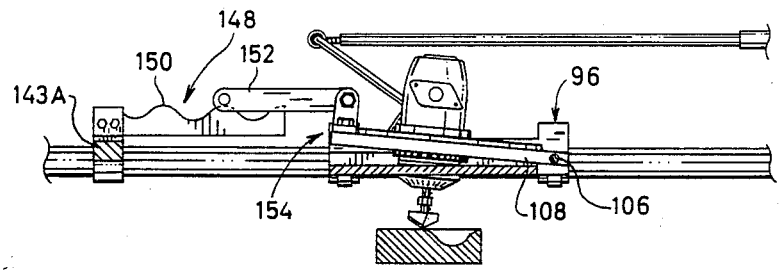

UNIVERSAL PROFILING MACHINE

DESCRIPTION

1. Technical Field

This invention relates generally to machinery that is suitable for producing a pattern in a work piece, and more particularly to a universal profiling machine capable of producing two or three dimensional patterns within such a work piece.

2. Background Art

In certain manufacturing procedures, it is desirable to produce a repetitive pattern in or on a work piece for aesthetic purposes. For example, in the production of fine wood furniture, doors or the like, it is commonly desired to have the wood profiled with a preselected pattern. Such profiling operations can be performed by a skilled craftsman. However, the manual production of profiled wood is time consuming and very expensive. Moreover, even skilled craftsmen are unable to produce identical patterns again and again as may be desired in certain mass production operations.

Accordingly, it is an object of the present invention to provide a universal profiling apparatus for producing a preselected pattern in or on a work piece such as wood.

Another object of the present invention is to provide such an apparatus which is capable of engraving, painting, applying spray paint or in general making patterns with various work piece engaging members or applicators.

It is also an object of the present invention to provide an apparatus which can quickly and efficiently produce a profiled work piece having a repetitive pattern which can be duplicated in successive operations of the machine.

Yet another object of the present invention is to provide a universal profiling apparatus which is capable of producing a two or three dimensional pattern having a preselected configuration.

Another object of the present invention is to provide such an apparatus which can be easily maintained and operated by unskilled craftsmen.

DISCLOSURE OF THE INVENTION

Other objects and advantages will in part be obvious and will in part appear hereinafter, and will be accomplished by the present invention which provides a universal profiling machine or apparatus which is capable of producing a repetitive, two or three dimensional pattern in or on a work piece. The pattern in the preferred embodiment has a common beginning and end location or point on the work piece and is produced by a work piece engaging member such as the blade of a router. The apparatus includes a frame which carries a work carrying means. This work carrying means supports and secures the work piece during operation of the apparatus. This work carrying means is rotated about a preselected axis. The work engaging member is reciprocated or moved along a preselected path during the production of the selected pattern. One reciprocating movement or cycle of the work engaging member is defined as the stroke. Means are also provided for reciprocating or moving the work carrying means along a preselected axis which is preferably perpendicular to the axis along which the work engaging member is moved. In the automatic mode of operation, the rotation and reciprocation of the work carrying means and the reciprocation of the work engaging member is selectively synchronized and the machine is capable of producing an infinite variety of patterns. Moreover, even and odd multiple patterns can be produced in the work piece.

BRIEF DESCRIPTION OF THE DRAWINGS

The above-mentioned features of the present invention will be more clearly understood from consideration of the following description together with the accompanying drawings in which:

FIGS. 8A and 8B illustrate template arrangements which can vary the movement of the work engaging member and its carriage in horizontal and vertical directions, respectively, as the carriage reciprocated along its preselected axis. As is illustrated in FIG. 8B, the vertical movement of the carriage about a pivot point enables plunging the work engaging member such as a router blade into the work piece at preselected intervals.

BEST MODE FOR CARRYING OUT THE INVENTION

Figure 1:
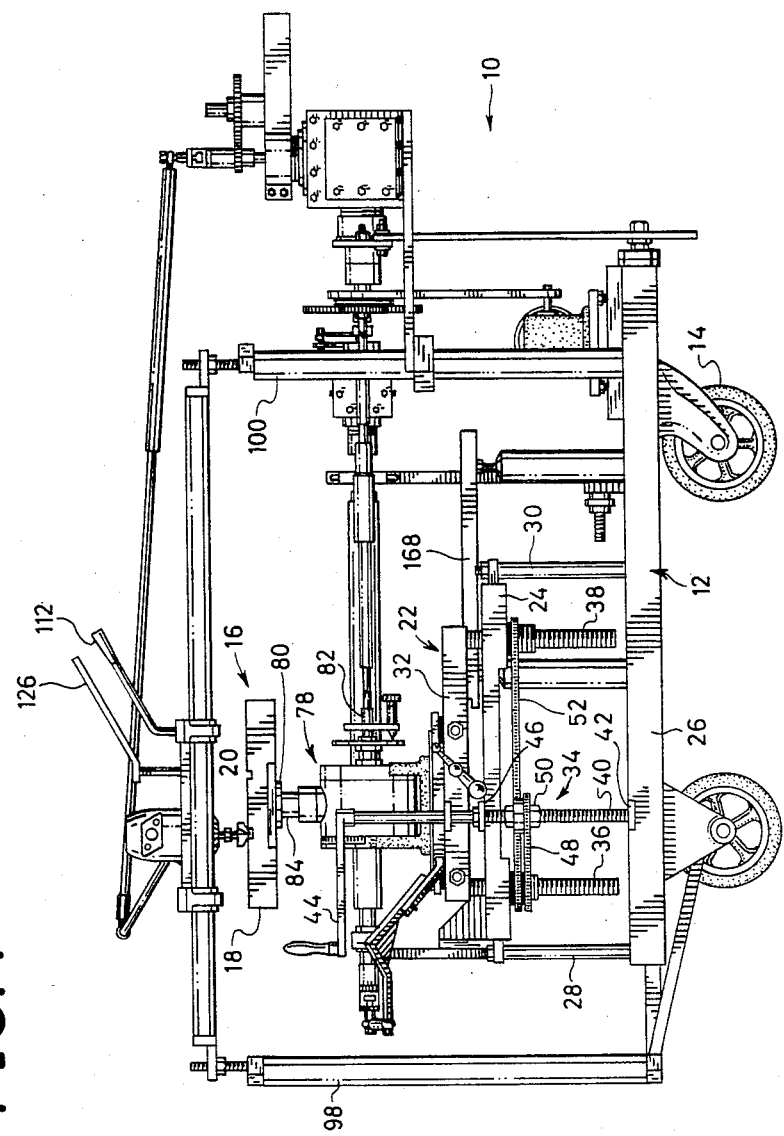
FIG. 1 is a side elevation view of an apparatus constructed in accordance with various features of the present invention.

Referring now to the figures, an apparatus constructed in accordance with various features of the present invention is generally depicted at 10 in FIG. 1.

This apparatus is capable of producing a preselected pattern upon or in a work piece such as wood, plastic, etc. The pattern can have a two or three dimensional configuration. The apparatus is capable of being operated in an automatic mode or in a manual mode. During the automatic mode of operation, the pattern is cyclic and the various movements performed by the machine can be synchronized in either even or fractional multiples or given different periods or phases. Such versatility enables the apparatus to produce an infinite variety of patterns in the work piece.

This apparatus is particularly suitable for functioning as a universal profiling machine for profiling a wooden work piece in accordance with a preselected pattern. The apparatus 10 includes a rigid frame generally indicated at 12 which carries the apparatus components. In the embodiment depicted in FIG. 1, two pairs of wheels are mounted on the under side of the frame 12 to facilitate movement of the apparatus to a desired location. These wheels are of conventional design and the front wheels 14 can pivot for purposes of guiding the device as it is pushed or pulled by an operator.

Figure 2:
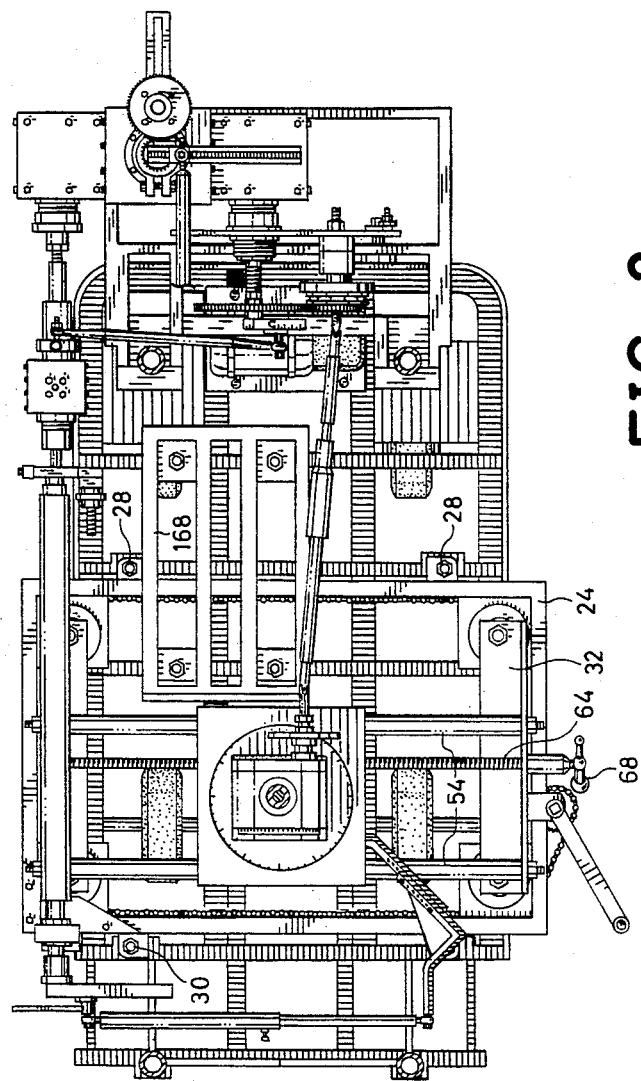
FIG. 2 is a plan view of the apparatus illustrated in FIG. 1.
Figure 4:
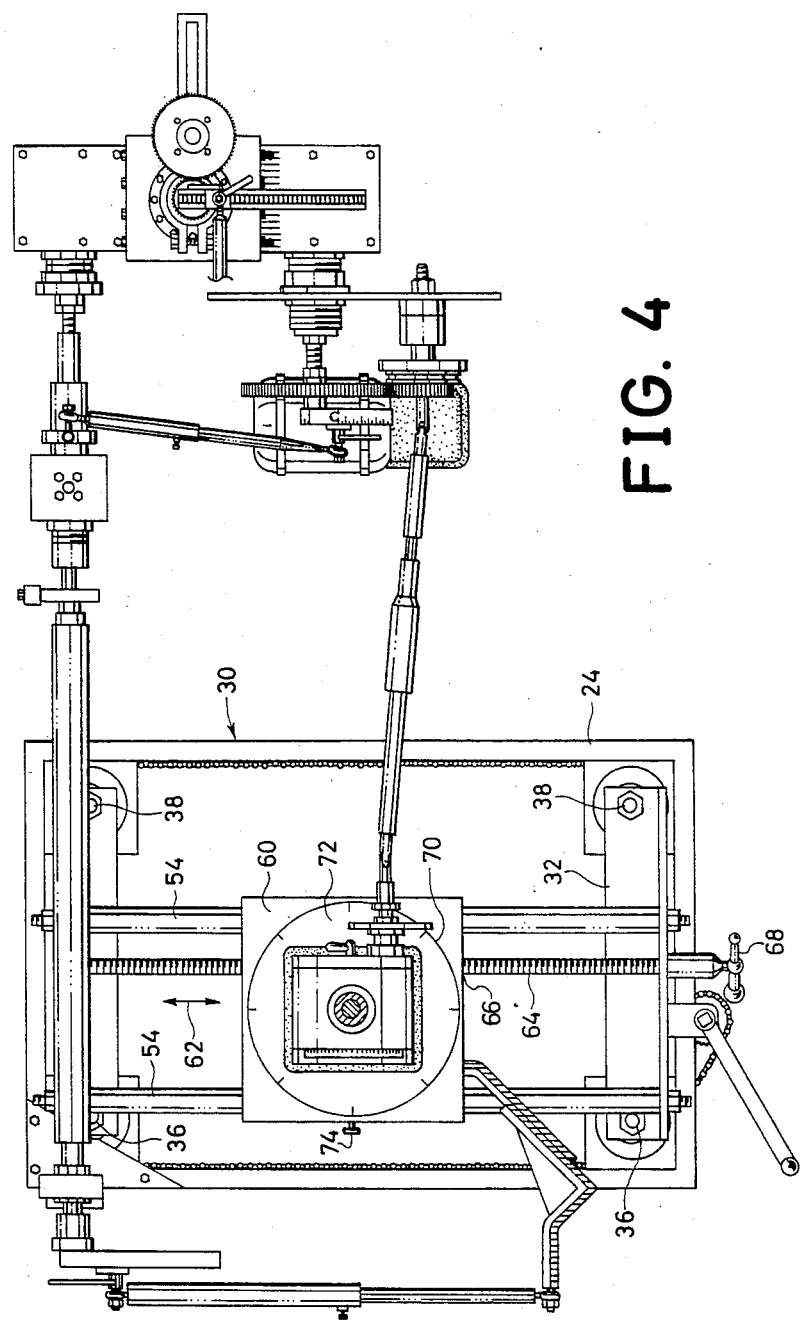
FIG. 4 illustrates portions of the apparatus which serve to rotate and reciprocate or move the work carrying means, with portions of the machine being broken away for illustrative purposes.

A work carrying means such as a face plate or chuck generally indicated at 16 serves to position a work piece 18 at a preselected location as this work piece is operated on by a work engaging member 20 which will be described in greater detail hereinafter. This face plate is mounted on the frame 12 and includes a support assembly generally indicated at 22. This support assembly in the illustrated embodiment includes a substantially rectangular platform 24 which is fixedly secured at a spaced location from the lower portion 26 of the frame 12 by the two pairs of post 28 and 30 as illustrated. This platform 24 supports the under carriage 32 of the work carrying means assembly 22. This under carriage 32 can be raised and lowered with respect to the platform 24 for purposes of positioning the work piece 18 at a desired vertical location. In this connection, an under carriage drive mechanism generally indicated at 34 is provided. This drive mechanism includes the two pairs of posts 36 and 38 which are externally threaded and received within operatively associated and internally threaded bores provided within the corner portions of the platform 24. As shown in FIG. 1, the upper portion of each of these posts 36 and 38 are secured to the respective corner portions of the under carriage 32 by suitable nuts as illustrated in FIG. 4. A drive screw 40 of the drive mechanism 34 is supportably received within the bored tabs 42 and 46 (see FIG. 2) carried by the lower portion 26 of the frame 12 and the platform 24, respectively. The opposite end portion of the drive screw 40 is substantially cylinderical in cross-sectional outline and rotatably driven by a suitable handle mechanism 44. Rotation of the handle 44 in a clockwise direction as seen in FIG. 1 will cause the drive screw 40 to rotate within tab 42 carried by the frame 12 and the tab 46 carried by the platform 24 and cause the internally threaded gear 50 to threadably advance downwardly as seen in FIG. 2. Drive chain 48 is trained about gear 50 carried by the drive screw 40. This gear causes the chain 48 to be driven and thus imparts rotation to the externally threaded post 36 and 38 through the illustrated gears. More specifically, the driven chain 52 is trained about suitable gears secured to each of the posts 36 and 38. This chain work path configuration is substantially rectangular in configuration as seen from above (see FIG. 4) and drivingly connects each of the externally threaded posts 36 and 38 such that as the handle mechanism 44 is rotated, the under carriage 32 is selectively raised and lowered through the drive chain and gear assembly described above.

Figure 6:
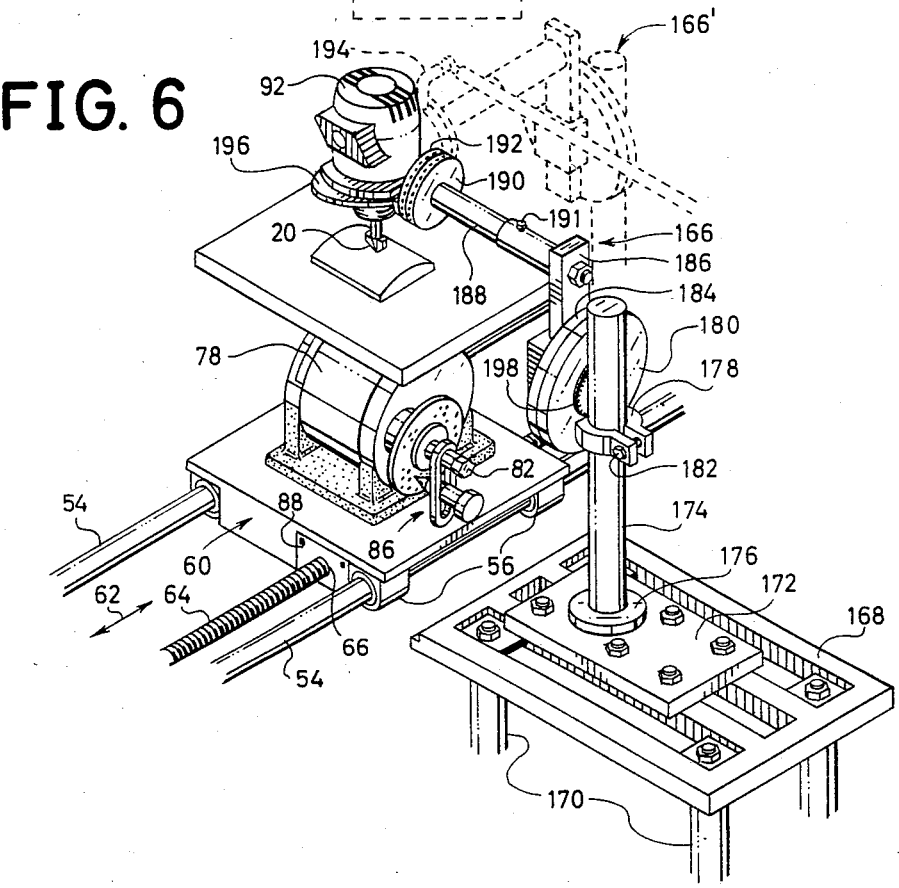
FIG. 6 illustrates an alternate device for moving the work engaging member along a selected arcuate path.

A pair of parallel ways 54 are carried by the under carriage 32 (see FIG. 4). These ways in the illustrated embodiment comprise cylinderical rods secured at their opposite end portions to the opposite ends of the under carriage 32 as seen in FIGS. 2 and 4. These ways 54 slidably receive the bearings 56 of the carriage 60 as depicted in FIG. 6. This carriage can be reciprocated in the direction of the arrow 62 in the manual or automatic mode of operation. During manual operation, the carriage 60 is driven along the length of the ways 54 by the drive screw 64 which is threadably received within a suitable internally threaded bore 66 defined within the carriage as illustrated in FIG. 4. This drive screw is rotated for positioning or moving the carriage along the ways 54 by rotation of the drive screw handle 68. The outboard end portion of the drive screw is rotatably received by a suitable collar carried by the illustrated cross bar 32 (see FIG. 1) to assist in stabilizing the screw.

As shown in FIG. 4, the carriage 60 defines a circular recess 70 which rotatably receives a base plate 72. Suitable indicia generally indicated by the marks on the base plate shown in FIG. 4 serve to determine the annular position of this base plate 72 with respect to the carriage 60 and suitable means such as the set screw 74 serve to lock the base plate 72 into a desired position.

In certain embodiments, the rotating base plate can be eliminated from the carriage 72; however, in the preferred embodiment, as illustrated in FIG. 4, to provide additional flexibility for the machine operation, the base plate is provided for reasons which will become clearer hereinafter.

A dividing head 78 of conventional design is carried by the carriage 60. It will be recognized by those skilled in the art that the dividing head includes a support platform or table 80 which is rotated upon driving or rotating the dividing head drive shaft 82. Thus, as the dividing head drive shaft 82 is rotated, the work piece 18 carried by the support 80 is rotated about a preselected axis, which is the axis of the dividing head shaft 84 as seen in FIG. 1. While a dividing head is a conventional commercially available unit, its motions and drive capabilities are particularly suitable for incorporation in the apparatus of the present invention. For example, the dividing head can serve to tilt the work table 16 and any work piece 18 carried thereby along an axis which is substantially parallel with a horizontal axis about which shaft 84 rotates. Moreover, rotation of the work table can be indexed by the indexing mechanism 86 of the dividing table (see FIG. 5). An alternate device or mechanism can be substituted for the dividing head as will be pointed out hereinafter.

In summary, the work table can be reciprocated or moved along the ways 54 or in the directions of the arrow 62. This is accomplished in the manual mode of operation by driving or rotating the drive screw 64 which engages the carriage 60 by means of the engagement plate 88 secured thereto by suitable screws. In the automatic mode of operation which will be described hereinafter, this engagement plate 88 is removed from contact with the carriage 60 as by threadably backing it away therefrom after the screws which secure the plate to the carriage are removed. Thus, the carriage 60 is free to slide along the ways 54 without interference of the engagement plate 88 or the underlaying drive screw 64.

Further, by employing a conventional dividing head 78 the work table 16 can be tilted along a horizontal axis perpendicular with the axis of the drive shaft 82 as shown in FIG. 1 and secured at a desired tilted position. The work table can also be rotated by driving the drive shaft 82 and in the manual mode of operation, such rotation can be indexed by the indexing mechanism 86. By placing the entire dividing head on a plate 72 as illustrated in FIG. 4, further rotational flexibility is provided. It will be noted that by combining the rotation of the entire driving head with the rotation of the dividing head shaft 84 about a horizontal axis, the angle at which the work engaging member such as a router blade contacts the work, can be varied for purposes of adjusting the depth of the cut, or for purposes of adjusting the location at which the work engaging member contacts the work.

Figure 3:
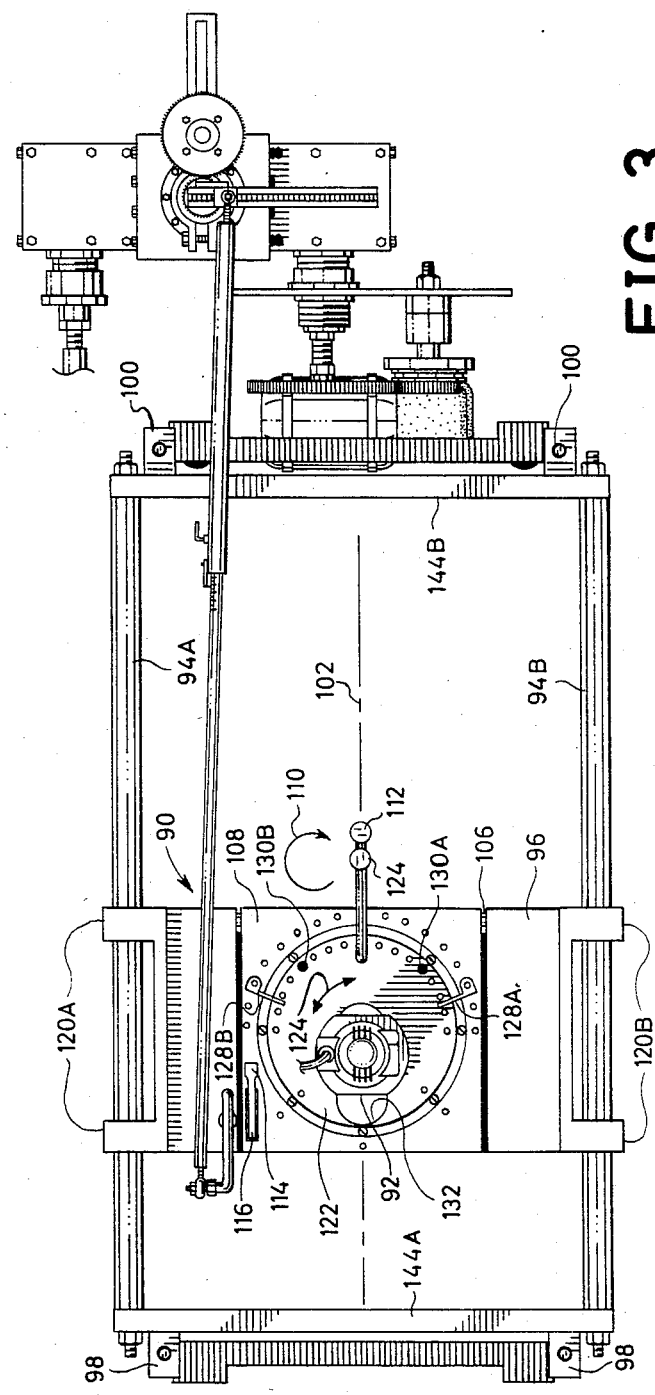
FIG. 3 illustrates a plan view of the assembly which carries the work engaging member during its reciprocation and other movements, with portions of the machine broken away for illustrative purposes.

Means 90 are provided for guiding the work engaging member 20, which in the embodiment illustrated in FIGS. 1 and 3 comprises a router blade carried by the router 92. In the illustrated embodiment, the means 90 comprises a pair of ways 94A and 94B as seen in FIG. 3 which serve to guide the travel of the operatively associated work engaging means carriage 96. These ways, 94A-B, are supported at their opposite end portion by the upright frame member pairs 98 and 100 illustrated in FIG. 1. It will be noted that the upper end portions of each of these member pairs carries threadably advancable leveling nuts which can be used to secure the ways in a level position. The center line of the work engaging member travel is illustrated by the axis 102 when the work engaging member 20 is carried in the center portion of the carriage 96.

This carriage 96 includes various features which enhance the flexibility with which the work engaging member can be positioned during the machine operation. More specifically, the carriage 96 includes a pivot axis 106 about which the carriage base plate 108 can be pivoted in the direction of the arrow 110 as seen in FIG. 3. This carriage base plate can also be pivoted by operation of the handle 112 which is joined with the carriage base plate as illustrated in FIGS. 1 and 3. Such pivoting motion can also be effected by rotation of the actuating arm 114 illustrated in FIG. 3 about its pivot point 116. This actuating arm engages the under carriage or a stop carried by the carriage frame for purposes of pivoting the base plate 108 in the direction of the arrow 110. Moreover, this actuating arm tip serves as a stop to maintain the base plate at a slightly tilted or pivoted position as for purposes of temporarily backing the work engaging member 20 away from contact with the work piece. This feature facilitates loading and unloading the work pieces.

A pair of bearings 120A-B slidably receive the ways 94A-B, respectively, for purposes of guiding the carriage 96 along a preselected path. It should be noted that since the bearings 120 slidably receive the ways 94, movement of the carriage with respect to the ways is precisely controlled for purposes of creating repetitive travels by the work engaging member. In the embodiment illustrated in FIG. 3, the work engaging member, which is a router blade in the depicted embodiment, is driven by the drive means or router 92. This work engaging member is carried by the carriage plate 122 which can be rotated in the direction of the arrow 124. This plate is slidably received at its perimeter between a recessed shoulder in the base plate 108 and a suitable collar secured thereto by the illustrated screws. Rotation of the plate 122 can be effected by rotating the handle 126 (see FIG. 1) in the desired direction.

During the manual mode of operation, it is often desired that the beginning and ending points of the rotation of the plate 122 be controlled such that the arc generated by the work engaging member is defined. In this regard, a suitable pair of stops 128A-B can be secured to the base plate 108. These stops will contact suitable posts 130A-B, respectively, for purposes of defining the beginning and end points of the arc through which the work engaging member is moved by pivoting the plate 122 with the handle 124 which is secured to the plate 122. As shown by the spaced openings on the base plate 108 about the perimeter of the opening receiving the plate 122, the stops and the posts can be adjusted for controlling the beginning and end points of the arc through which the work engaging member is moved by the handle 124.

The carriage plate 122 is provided with an eccentric opening 132 which in the illustrated embodiment receives the drive portion of the router 92. This router 92 is secured within the eccentric opening 132 by sandwiching the perimeter of the plate 122 proximate the opening 132 between threadably advancing collars carried by the portion of the router proximate the work engaging member. Thus, the work engaging member can be adjusted along the length of the axis of the eccentric opening 132 thereby varying the eccentricity of the stroke as the plate 122 is rotated as by operation of the handle 124.

Figure 7:
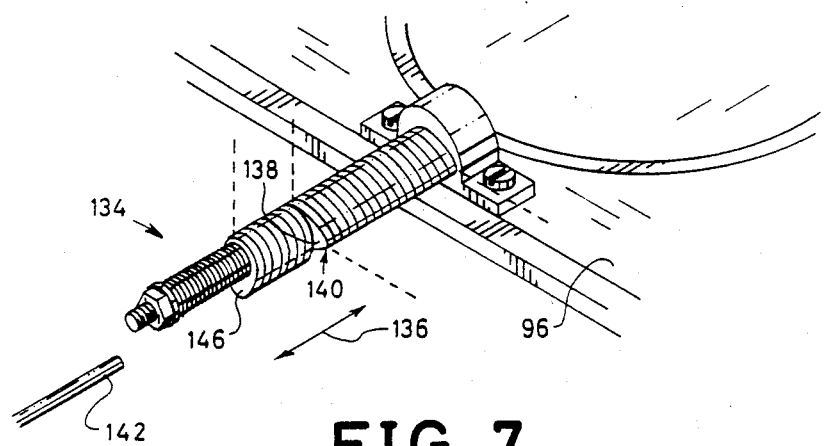
FIG. 7 illustrates a suitable embodiment of stops which determine the length of travel and placement of the stroke of the work engaging member for producing repetitive patterns during the manual mode of operation of the work engaging member and its respective carriage assembly.

During the manual mode of operation, it is desirable to be able to control the beginning and end locations of the stroke of the work engaging member as the carriage is moved along the axis 102. One embodiment of means for defining the beginning and end points of the travel of the work engaging member along the ways 94 is illustrated in FIG. 7. Such means generally indicated at 134 can be mounted at opposite end portions of the carriage 96 which reciprocates in the direction of the arrow 136. The illustrated means 134 comprises a plurality of pivoting tabs 138 which can be pivoted to the location indicated at 140 such that the outer most tab engages a suitable stop post 142 carried by the cross frame member 144A and/or 144B which supports the opposite end portion of the ways and is carried by the upright frame members 98 and 100. These tabs 138 are of predetermined thickness for desired travel increments. This mechanism could be particularly useful in producing an elliptical pattern in the work piece.

By flipping the spring biased tabs to the location 140 or away from the location 140 to the location 146, it will be noted that the tip of the stop 142 will engage the tab to control the point at which the reciprocating motion of the carriage 96 touches off from the stop post 142. Thus, the means 134 serves to define and enable varying the beginning and end points of the travel or stroke of the reciprocating carriage and the work engaging member during the manual mode of operation. The spring serves to hold the tabs in the position to which they are manually moved. The length of the stroke of the reciprocating or moving carriage 96 can be varied in increments equal to the width of a single tab flipped from a stopping position to its out of the way or downwardly depending position illustrated at location 146.

FIG. 8B illustrates diagrammatically means for varying the motion of the work engaging member in a vertical direction with respect to the axis 102 of reciprocation or movement. More specifically, means generally generated at 148 comprises an enlongated template 150 which is carried at its inboard end portion by a sliding cross frame member 143A. This template or cam 150 engages a follower 152 carried by the base plate 108 of the carriage 96. The template can provide for multiple plunges at premeasured increments or can slope the travel of the work engaging member switch that it slopes out of and/or disengages the work piece at the same location during its travel. It will be recalled that the base plate 108 pivots at the pivot points illustrated diagrammatically at 106. Thus, as the follower 152 carried by the frame 154 which is rigidly secured to the base plate 108 as illustrated, follows the outline of the cam upper surface 150, the base plate 108 will be pivoted about the pivot point or axis 106 thereby raising and lowering the work engaging member carried on the underside of the base plate 108. This enables a variance of the depth with which the work engaging member cuts or routes the work piece.

Similarly, the rotational movement of the plate 122 can be controlled by a suitable cam or template 156 (see FIG. 8A) which is carried by the cross member 145B. This cam or template 156 will receive a suitable follower 158 which is carried at its opposite end by the plate 122. As the carriage 96 reciprocates along the length of the ways 94, the plate 122 will be rotated thereby providing means generally indicated by 160 which serve to vary the horizontal travel of the work engaging member as the carriage 96 reciprocates along the axis 102. It will be noted that the position of the cross bar 145B can be adjusted along the length of the ways by the illustrated positioning screws.

The path along which the work engaging member is moved is not necessarily restricted to a particular plane as is illustrated by the work engaging member rotational assembly located generally at 166 in FIG. 6. This rotation assembly 166 is carried by the table 681 which is illustrated in FIGS. 1, 2 and 6. As shown in FIGS. 1 and 6, the table is supported at a spaced location above the lower portion 26 of the frame 12 by the upright posts 170 depicted in FIG. 6. It will be noted that the rotational assembly 166 can be positioned proximate one end portion of the ways 54 as illustrated in FIG. 6 for an automatic mode of operation. This table supports the base 172 of the rotational assembly. This base is secured to the table by a plurality of bolts as illustrated. The base carries an upright support member 174 which is secured to the base 172 and reinforced by a suitable collar 176. This upright member slidably receives a yoke 178 which carries a plate 180. The vertical position of this yoke and the assembly supported thereby can be adjusted by the illustrated yoke bolt 182. A cooperating and juxtaposed plate 184 rotates with respect to the plate 180. This plate 184 carries the upright arm 186. This arm supports at its outboard portion a telescoping drive rod 188.

The effective length of this drive arm 188 can be adjusted by the threaded stud 191 which engages the smaller diameter rod which is telescoped into the larger diameter receiving section proximate the arm 186. The outboard end portion of the drive rod 188 carries a further plate 190 which rotatably receives the cooperating and juxtaposed plate 192. This plate 192 rotates with respect to the plate 190 as does the plate 184 rotate with respect to the plate 180. The plate 192 can be driven as by rotating the stud 194, as shown in the alternate position of the rotational assembly at 166'. It will be noted that this stud 194 can be connected to the outer end of a drive rod for automatic operation.

It will be noted that in the illustrated embodiment the work engaging member 20 is driven by the router 92. This router is carried by a suitable bracket 196 which is secured at its inboard end portion to the rotating plate 192. Upon fixedly securing the plates 184 and 180 together by the tension screw 198 and rotation of plate 192 with respect to the plate 190, it can be visualized that the work engaging member 20 will produce a concave path. Thus, the rotational assembly 166 provides means for generating a concave travel of the work engaging member. Similarly by securing the plate 192 to the plate 190 such that these plates will not rotate with respect to each other as with a conventional set screw or clamp (not shown) and by releasing the tension screw 198 such that plate 184 can rotate to respect to 180, the work engaging member will travel along a convex path upon driving the drive rod 188 along a rotational path as by rotating the stud 194, when the assembly is in the alternate position shown by the phantom lines in FIG. 6.

Thus, in the manual mode of operation, the work carrying means can be positioned at a preselected location with respect to the central way axis 102 with a drive screw 64. Rotation of the work carrying means can be accomplished by the indexing mechanism 86. The work carrying means can be slanted or sloped by tilting the dividing head 78. Additionally, the work carrying means can be rotated by rotating the base plate 72 carried in the circular recess 70 of the carriage 60 upon which the dividing head rests. With respect to the work engaging member and its various motions, the work engaging member can be reciprocated at a preselected location, and it can be moved along a preselected arc by operation of the handle 112 for pivoting to raise or lower the base plate 108. Further, the actuating arm 114 can serve to tilt the base plate 108 thereby tilting the work engaging member. Further, the eccentricity of the work engaging member can be adjusted by the position of the work engaging member with respect to the eccentric opening 132.

With these various optional motions in mind, patterns which are capable of generation during the manual mode of operation are illustrated in FIGS. 13A-B and 14A-B. For example, by commencing a stroke at the center of the work piece and tilting the dividing head for adjusting the depth of the cut, a pattern such as that shown in FIG. 13B can be produced. It will be noted that each time the work engaging member is indexed rotatably by operation of the handle 126 (see FIG. 1) from the beginning point of the stroke to the end point of the stroke the dividing head shaft 80 is indexed and the stroke is repeated. It will be noted that the end portion of the stroke farthest from the center line is broader due to the shape of the router blade. Thus, the shape of the blade or work engaging member assist in producing a design of a particular choice.

Figure 14A:
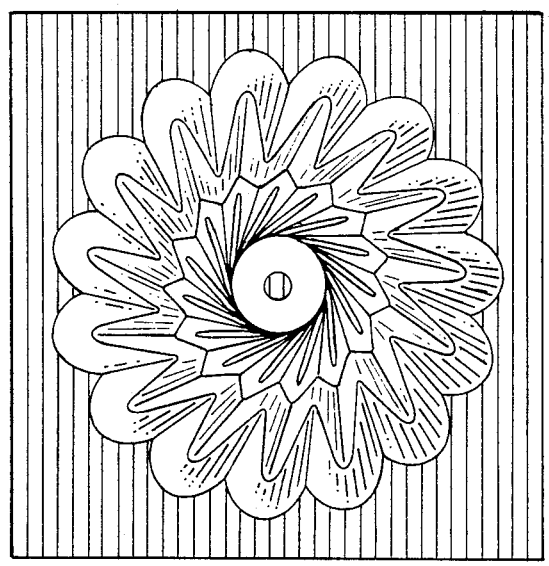
Figure 14B:
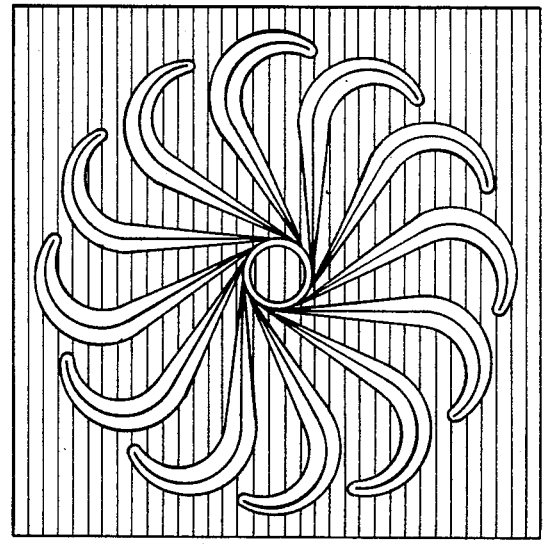

FIG. 14B illustrates a further pattern which can be produced by hand operation of the work engaging member. In this illustration, the work piece is centered on the work carrying means and the router beginning stroke is at the center of the work piece and the end stroke of the router is at the portion farthest from the center. The dividing head is tilted slightly to vary the depth of the cut as the router moves through its stroke. Each stroke includes two movements or sections, namely a radially outward movement terminating in an arc. After each stroke is made, the router is disengaged, brought back to the beginning point of the stroke and the dividing head is indexed a desired amount prior to commencement of the subsequent strokes.

Figure 5:
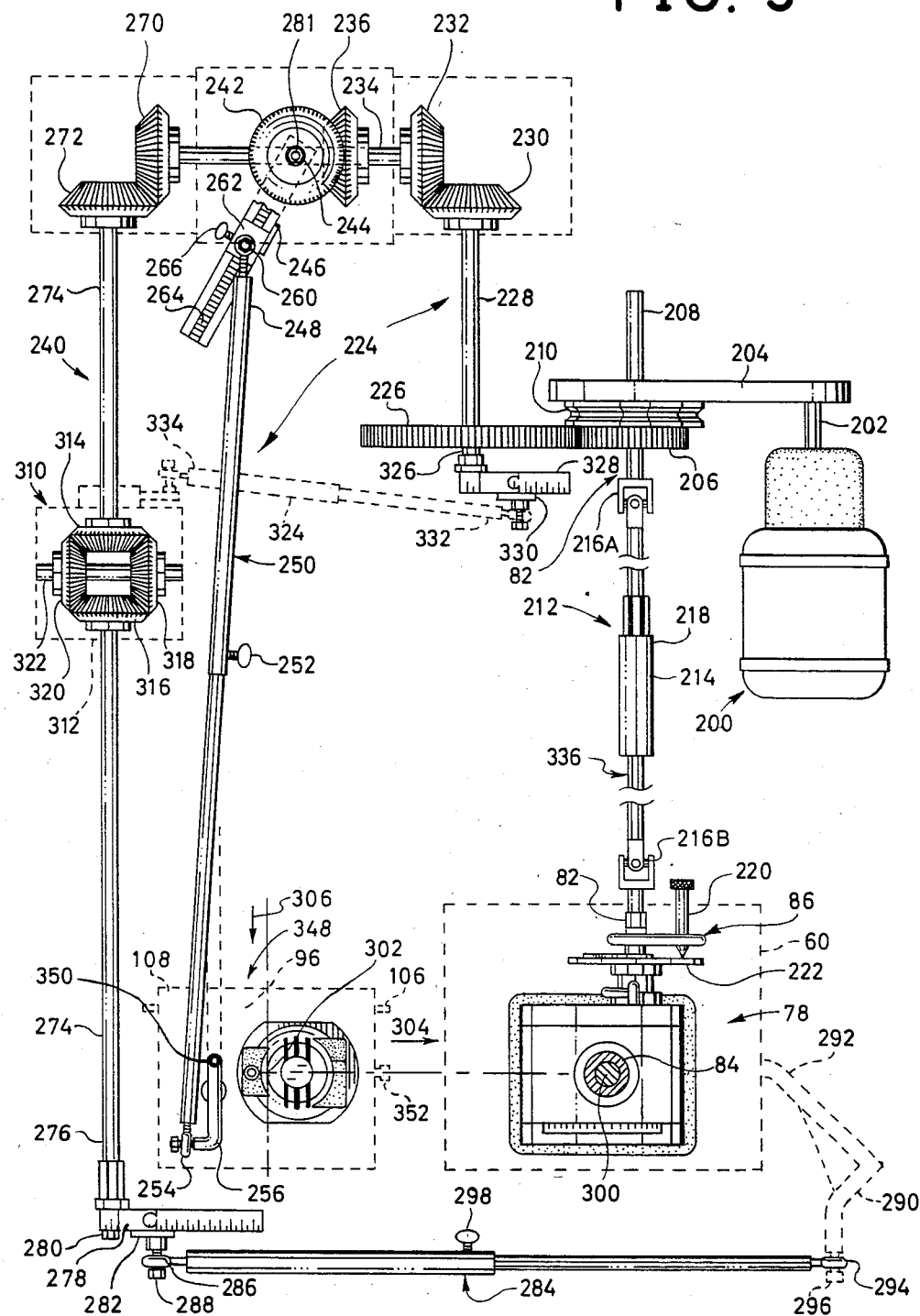
FIG. 5 diagrammatically illustrates the driving mechanism for imparting the various motions to the work carrying means and the work engaging member.

The automatic mode of operation enables an operator to produce a preselected pattern automatically. Referring now to FIG. 5, the drive means, which serves to drive the apparatus during the automatic mode of operation is indicated generally at 200. This drive means 200 in the illustrated embodiment is a conventional electric motor having conventional on and off switches (not shown). The motor drives a drive shaft 202 which carries a sheave at its outboard end portion about which is trained a belt 204. This belt is drivingly connected to a power take off idler gear 206 which is driven as a further sheave mounted on the shaft 208 is driven by the belt 204. An alternate sheave 210 serves as means for varying the rotational speed of the drive gear or power take off 206. The mounting of the various components of the drive means and connecting means illustrated in FIG. 5 can be more fully appreciated by viewing FIGS. 1 and 2 which illustrates the various arms and support members which mount these mechanisms on the frame. FIG. 5 has broken various portions of the frame member and components away to more clearly illustrate the operation of the drive means and connecting means controlling the various motions or procedures of the machine.

The drive gear 206 is connected to the drive shaft 82 of the dividing head 78 for purposes of rotating the work carrying means 16 upon which the work is mounted. As described above, the shaft 84 (see FIG. 1) is rotated by rotating the drive shaft 82. Rotation of the shaft 84 in turn rotates the work carrying means support 80 and thus rotates the work piece. In the embodiment illustrated, the connecting means 212 serves to connect the driven shaft 210 and the drive shaft 82 of the dividing head. This connecting means 212 includes a drive shaft 214 having universal joints 216A and 216B at its opposite end portions. Further, a telescoping spline connector 218 allows the effective length of the connecting means 212 to extend as the dividing head in its operatively associated carriage illustrated diagrammatically at 60 in FIG. 5 reciprocates.

While in the embodiment illustrated, the shaft 208 serves as the power take off point for driving the various motions of the machine. It will be recognized by those skilled in the art that an alternate shaft could serve as such power take off point. For example, the shaft 274 which serves to drive the reciprocation of the work carrying means and its associated carriage 60 could serve as the power take off point as could shaft 234, at either of its ends, and the shaft 208 could be connected with gears to such power take off point.

When the dividing head is in the automatic mode of operation and the drive shaft 82 is rotated, the indexing pin 220 is disengaged from the indexing plate 222 such that this shaft is free to be driven directly by the connecting means 212. It will be recalled that this indexing mechanism serves to rotate the work carrying means during the manual mode of operation.

The speed with which the shaft 208 is driven is controlled by the rotational speed of the drive shaft 202 of the drive means 200 and the ratio of the sheaves connected by the belt 204. The drive gear 206 in the illustrated embodiment serves as the power take off point and has a diameter which can be preselected. This drive gear 206 serves to provide the power take off point for driving both the reciprocation of the carriage 60 and its work table and the reciprocation of the carriage 96 which carries the work engaging member 20. Thus, it is the distribution center for the apparatus power in the automatic mode of operation. More specifically, connecting means are provided between the drive gear 206 and the carriage 96 which serves to carry the work engaging member 20 in its reciprocating motion. In the illustrated embodiment, the connecting means for driving and/or reciprocating the carriage 96 is generally indicated at 224 (see FIG. 5). This connecting means 224 includes a gear 226 rotatably mounted on the frame and secured to the shaft 228 which carries at its opposite end portion a miter gear 230. This miter gear is drivingly connected with a further miter gear 232 carried by the shaft 234. This shaft 234 carries a further miter gear 236. It will be noted that the connecting means 224 which drives the work engaging member along its reciprocating path or stroke and the connecting means which drives the work table along its reciprocating path, and which will be described in greater detail hereinafter, share a common portion of the drive train between the drive gear 206 and the miter gear 236.

This miter gear 236 is drivingly connected to a further miter gear 242 which is carried by a shaft 244. This shaft 244 rotates about a vertical axis as seen in FIG. 5 and is connected to a drive arm 246 which rotates as the miter gear 242 rotates. This drive arm 246 is connected through a rod end bearing 260 to one end portion 248 of a telescoping drive shaft 250 whose effective length is fixed by the wing nut 252, or the like, in a conventional manner. The opposite end portion of the drive shaft 250 carries a rod end bearing 254 which is connected through a connecting rod 256 to the carriage 96 which is mounted the work engaging member. It will be noted that the end portion 248 of the drive shaft 250 is connected through a rod end bearing at a selected location along the length of the drive arm 246. The position at which the end portion or the rod end bearing is connected to the drive arm 246 determines the length of the stroke of the work engaging member carried by the carriage 96.

The position at which the rod end bearing 260 is secured to the driving arm is determined by the position at which the block 262 is secured within the groove 264 of the drive arm. This position can be secured as with the illustrated set screw 266. More specifically, the block 262 is designed for being slidably received within the groove 264. The distance between the rod end bearing 260 and the axis of the shaft 244 determines the length of the stroke of the work engaging member. More specifically, the stroke of the work engaging member will be twice the length between the point at which the drive shaft 250 is connected to the drive arm 246 and the center line or axis of the shaft 244. This can be readily seen in FIG. 5 since the work engaging member will be at its farthest point from the axis of the shaft 240 when the drive arm is aligned with the shaft 250 and at its closest point to the axis of the shaft 244 when the drive arm is on the opposite side of the miter gear 242 but underlaying a portion of the shaft 250. The position of the stroke will be determined by the effective length of the drive shaft 250 as adjusted by the set screw 252 as a smaller diameter portion of the telescoping shaft 250 is received within the larger diameter portion of the same.

The connecting means for 240 for reciprocating the work carrying means in the automatic mode operation will now be described. As mentioned hereinabove, the portion of the drive train from the miter gear 236 back to the drive gear 206 of the connecting means 240 is common with the connecting means 224. As illustrated in FIG. 5, the shaft 234 which carries the miter gear 236 carries a farther miter gear 270 at its outboard end portion. This miter gear 270 drives the operatively associated miter gear 272 carried by the drive shaft 274 of the connecting means 240. This drive shaft 274 at its outboard end portion 276 carries a drive arm 278 which is secured thereto by the bolt 280. This drive arm and the associated sliding block 282 are substantially identical to the drive arm 246 and the operatively associated sliding block 262 described in greater detail hereinabove. The telescoping drive shaft 284 connects the rod end bearing 286 which is joined through the illustrated bolt 288 with the drive arm and the connecting rod 290 which is secured at its end portion 292 to the carriage 60. As shown in FIG. 5, the rod end bearing 294 is secured to the connecting rod by the illustrated bolt 296. The effective length of the drive rod can be adjusted by telescoping the smaller diameter portion of the rod as illustrated within the receiving larger diameter portion and securing the relative position of the two rods with the set screw illustrated at 298. As described in connection with the connecting means 224, the stroke of the work piece that is the length of the movement of the axis 300 of the shaft 84 when this shaft is in a vertical position is defined by the distance the end portion of the drive shaft 284 carrying the rod end bearing 286 is spaced from the axis of the shaft 274. The placement of the stroke is defined by the effective length of the drive shaft 282 as determined by the telescoping shaft members of larger and smaller diameters as illustrated.

As described generally above, FIG. 5 illustrates the mechanism carried by the frame which controls the automatic mode of operation. In order to more clearly appreciate the patterns of infinite variety which can be produced by the machine, it is advantageous to define the center of the machine for purposes of a reference point, as being the intersection of the axis 102 (see FIG. 3) which extends midway between and parallel with the ways guiding the carriage 96, and the axis 300 of the shaft 84 (see FIG. 5) when this shaft is in a vertical position and a position below the carriage 96. As shown in FIG. 5, the carriage 60 carrying the work carrying means has been moved to the side of the axis 102 along which the carriage 96 travels for illustrative purposes. With this reference point or machine center point 302 as illustrated in FIG. 5 in mind, the variables which effect the pattern produced during the automatic mode of operation will be understood. More specifically, these variables consist of the stroke placement and stroke length of the work engaging member; the stroke placement and the stroke length of the work carrying means together with the relative period of the rotation of the work carrying means as driven by the connecting means 212 with respect to the period of reciprocation of the carriage 96 and with respect to the reciprocation of the carriage 60. Further, a phase angle between the work engaging member travel and the work carrying means travel substantially effects the pattern generated. The work engaging member and the work carrying means are in phase with respect to their reciprocating motion when each commences a simultaneously outward travel from the machine center point as seen above or from another reference point. Thus, if the axis of the shaft 84 is at the machine center point as when the carriage 60 underlays the carriage 96 and the carriage 60 commences motion in the direction of the arrow 304 and the carriage 96 commences motion in the direction of the arrow 306 the reciprocating motion of the work engaging member and the work carrying means are in phase. Of course, this phase may be out of phase by up to but not including 180 degrees. The phases may be adjusted by releasing the bolt 280 and its associated drive arm and the nut 281 and its associated drive arm rotating the drive arms to a desired phase relationship and then securing the drive arms with the bolts 280 and 281 respectively at such rotational or phase relationship desired.

Means are also provided in one embodiment for varying the phase relationship automatically and for varying the rate of change of the phase relationship. One suitable means for varying such phase relationship is illustrated by the intermittent motion device illustrated at 310. This device is carried in a suitable housing 312 which as illustrated, includes juxtaposed miter gears 314 and 316 which are drivingly connected through miter gears 318 and 320 which rotate about a free wheeling shaft 322 which is common to each of these miter gears. This phase varying device 310 or intermittent motion machine is of conventional design and described in greater detail in *Ingenious Devices*, published by the Industrial Press, Inc., 200 Madison Avenue, New York, N.Y. 10157, and authored by Franklin D. Jones, et al.

More specifically, the intermittent motion device varies the phase by being drivingly connected through the drive shaft 324 illustrated in FIG. 5 to the end portion 326 of the shaft 228 carrying the driven gear 226. More specifically, the end portion 326 of the shaft 328 carries a drive arm 328 and operatively associated block 330 similar to the drive arms and blocks described with the connecting means 240 and 224. The end portion 332 of the drive shaft 324 is connected to this block and can be secured as described above at a spaced location from the axis of the shaft 228 to determine the stroke of the opposite end portion 332 of the drive shaft 324 which is connected through the illustrated connection to the housing 312 of the intermittent motion device 310. Thus, the length of the stroke of the end portion 334 of the shaft 324 can be controlled by the drive arm 328 as described hereinabove and the phase can also be controlled by adjusting the effective length of the drive shaft 324. Moreover, the intermittent motion device further adjusts the phase of the relative movements.

Figure 5A:
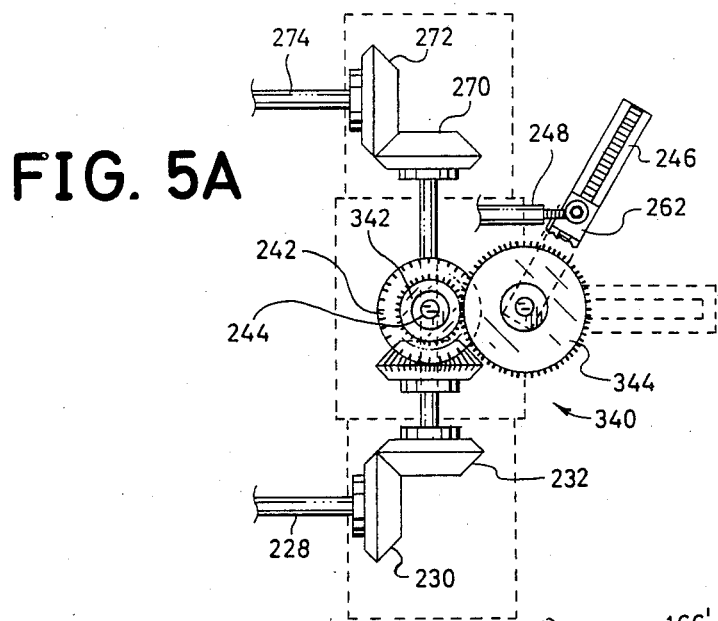
FIG. 5A illustrates a dividing mechanism used to vary the period of the cycle of reciprocation of the work engaging member during automatic operation.

As can be seen in FIG. 5, the ratio of the miter gears driving the connecting means 224 beyond the miter gear 236 and the ratio of the miter gears driving the connecting means 240 beyond the miter gear 236 are 1:1 such that the period (T) of the motion of the work engaging member and the work carrying means are identical. This period can be varied by period varying means generally indicated at 340 in FIG. 5A. The illustrated period varying means is introduced into the drive train connecting the connecting means 224 with the carriage 96 which carries the work engaging member 20. The illustrated period varying means includes a gear 342 which is carried by the shaft 244 which also carries the miter gear 342. This gear 342 drives the gear 344 which carries the drive arm 246 upon which the block 262 is positioned. If the ratio of the spur gears 342 and 344 is 2:1, the period of the reciprocating motion of the work engaging member will be one-half of the period of the reciprocating motion of the work carrying means. This period varying means 340 thus serves to adjust the respective periods of the reciprocation of the work engaging member with respect to the reciprocation of the work carrying means. This period varying means could also be introduced as at the location 336 in the connecting means 212. In this manner, the period of the rotation of the work carrying means could be varied with respect to the other periods of the machine procedures.

In accordance with a further feature of the present invention, means are provided for causing the work engaging member to periodically plunge into the work piece. Such means for plunging the work engaging member is generally indicated at 348 in FIG. 5. In this connection, a rod 350 extends upwardly from the carriage base plate 108 which pivots along the axis 106. The carriage can then be secured at a set location along the length of the way as is illustrated diagrammatically by suitable wing nut 352. The bolt securing the rod end bearing 254 to the upper end portion of the rod 350 extending in a vertical direction from the carriage base plate 108, reciprocation of the connecting means drive shaft 250 will cause the work engaging member to plunge downwardly periodically in as much as movement along the axis 102 of the carriage if prohibited by this wing nut 352.

It will be noted by those skilled in the art that the ratio of the gears 206 and 226 can be changed. This gear ratio change will vary the period of the movements driven through the respective gears. Additionally, fractional and multiple periods of the carriage movement, in the automatic mode, can be adjusted with respect to the work rotation period. These adjustments enable providing an infinite variety of producible pads by operation of the present machine.

Figure 9:
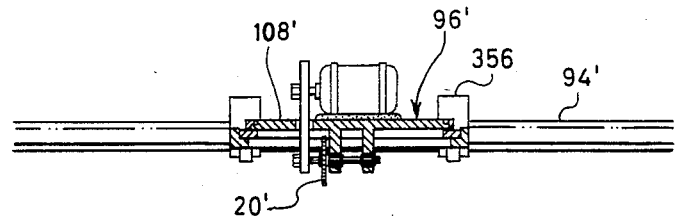
FIG. 9 illustrates an alternate embodiment of a work engaging member as carried by its carriage.
Figure 10:
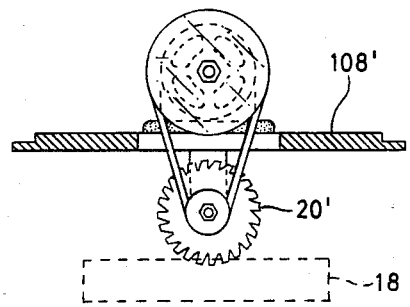
FIG. 10 illustrates a saw blade which can be used as the work engaging member and its operative associated carriage mechanism. This is a close-up of the device illustrated in FIG. 9.

FIG. 9 illustrates an alternate carriage 96' which serves to carry the work engaging member 20'. This carriage 96' is mounted on the ways 94' in a conventional manner. As shown in FIGS. 9 and 10, the carriage carries a base plate 108' which is substantially circular in cross-sectional outline. This base plate includes a shouldered perimeter as illustrated in FIG. 10 which is received within suitable mounts carried on the carriage frame members illustrated in FIG. 9 at 356. This base plate 108' carries the illustrated motor which is drivingly connected through the belt to a work engaging member 20'. This work engaging member comprises a side-cutting saw blade which cuts into the work piece 18. The shape, length and cutter edge angles of the side-cutting blade teeth enable side, forward or reverse cutting of the work piece. This saw blade is mounted below the carriage as shown in FIGS. 9 and 10 in a conventional manner. It will be noted by those skilled in the art that the saw blade will cut a narrow or widened line within the work piece depending on the angle of its rotational axis with respect to its movement relative to the work piece. Thus, different geometric configurations can be produced by using the arrangement illustrated in FIGS. 9 and 10.

Figure 11:
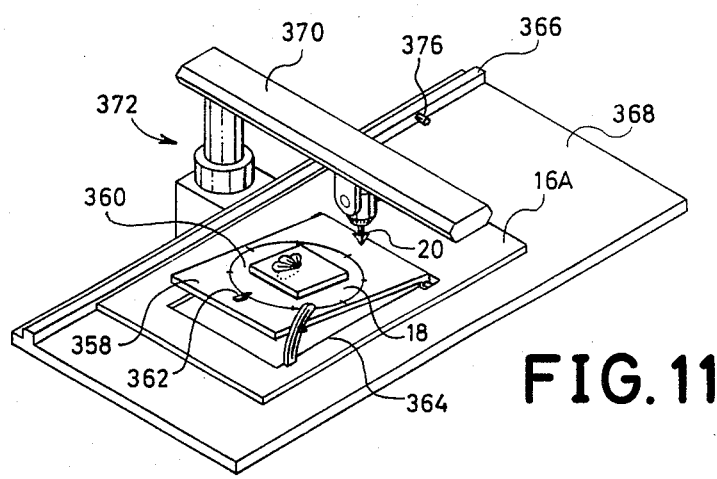
FIG. 11 illustrates a simplified version of an apparatus used for making certain patterns.
Figure 13A:
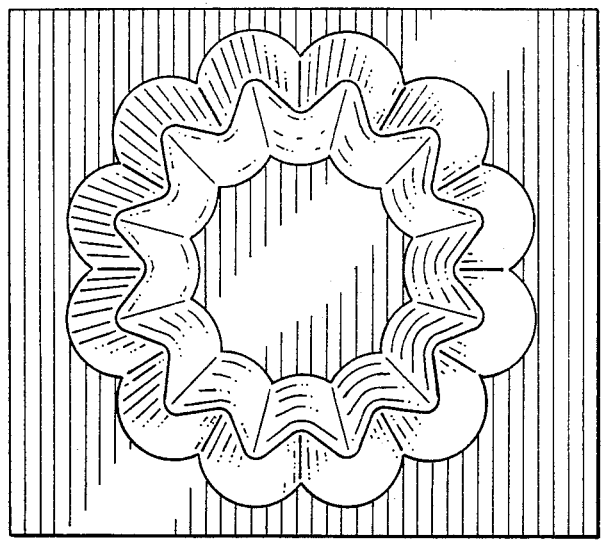
FIGS. 13A-B, 14A-B and 15A-B illustrate exemplary patterns which can be produced by an apparatus incorporating various features of the present invention.
Figure 13B:
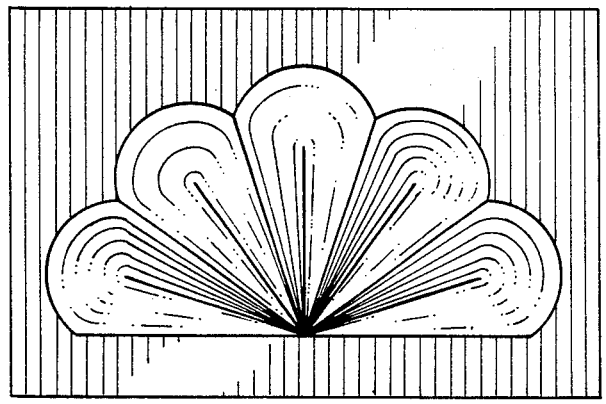

FIG. 11 illustrates a simplified alternate embodiment of a machine constructed in accordance with various features of the present invention used for the manual production of two and third dimensional patterns in a work piece. In this embodiment, work carrying means 16A carries a work piece 18 which is moved with respect to the work engaging member 20. More specifically, the work carrying means 16A includes the illustrated base plate upon which is pivotically mounted a further plate. This plate 358 rotatably receives the plate 360 which supports the work piece 18. This plate 360 can be rotated with respect to the plate 358 and an indicator 362 can be used to mark and/or secure the relative rotation of such plates with respect to each other. Moreover, the pivotal movement of the plate 358 can be determined by the screw and slot arrangement 364 as illustrated. This arrangement 364 serves to secure the slope of the work piece with respect to the work engaging member. Reciprocation of the work carrying means 16A is guided by the guide rail 366 carried proximate one marginal edge of the support 368 as illustrated. Movement of the work carrying means can be limited by the stop 367 as shown. The work engaging member is carried by the horizontally extending arm 370 which positions the work engaging member over the work piece 18. This arm is supported in a conventional manner by the support structure generally indicated at 372. Thus, the device illustrated in FIG. 11 allows manual production of selected patterns within a work piece.

Figure 12:
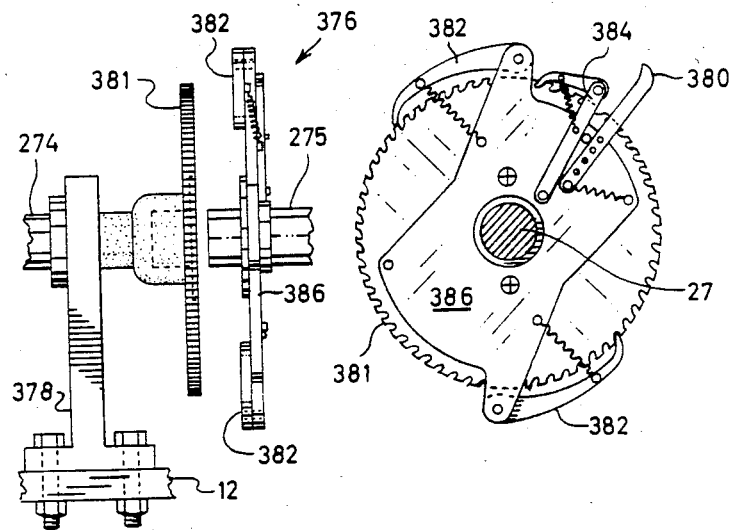
FIG. 12 illustrates a mechanism which varies the phase of the machine section driven through this mechanism by advancing the rotation of the drive shaft.

Means generally indicated at 376 (see FIG. 12) serves to advance the rotation of a shaft such as the shaft 274. More specifically, in the illustrated embodiment this shaft is rotatably supported within the bracket 378 carried on the frame 12. The rotation of the shaft section 275 will be advanced with respect to the rotation of the shaft section 274 upon engagement by the actuator 380 of a suitable member carried by the frame. More specifically, the plate 382 is provided with a plurality of spaced teeth which are engaged by the spring biased levers 382. When the trip lever 380 touches off on a stationary stop, for example on the machine, this advances the pivot lever 384 and the levers 382 set the position of the rotation of the plate 386 with respect to the plate 382. It will be noted in FIG. 12 that views of the means of advancing the rotation of the shaft are shown both in elevation and as the device plates are seen face on.

Figure 15A:
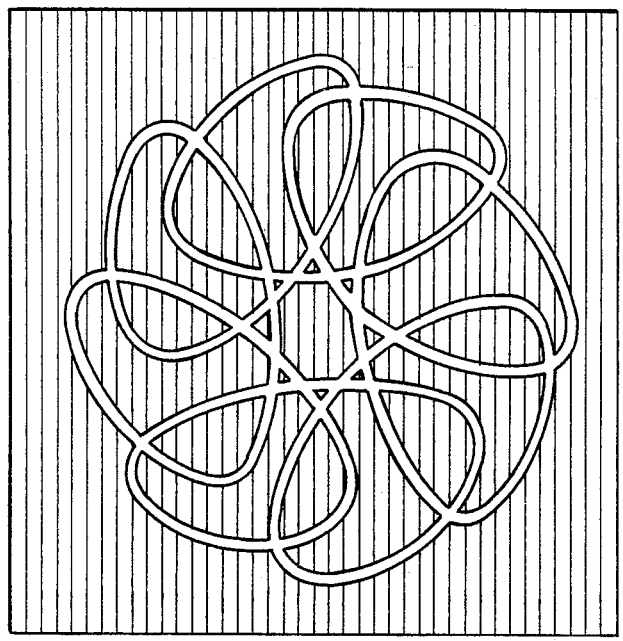
Figure 15B:
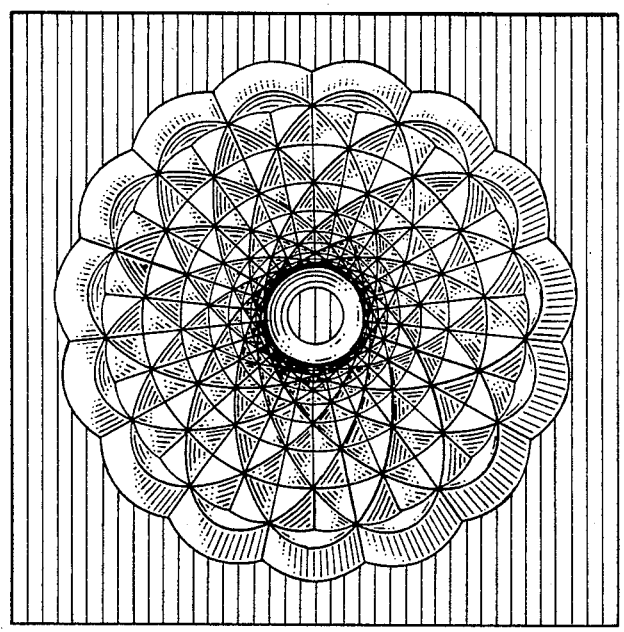

An infinite variety of patterns can be generated in the automatic mode of operation by the described and illustrated apparatus. Exemplary patterns are depicted in FIGS. 15A-B. In the pattern shown in FIG. 15B, the work engaging member is reciprocating with the stroke mid point being at the center point of the work piece. The stroke is the movement of the work engaging member, or the work piece relative to the work engaging member from its beginning point to the end point of the travel. In a reciprocating stroke, the travel will have a beginning point, as end point (farthest from the beginning point, when the travel is a straight line) and then return to or proximate the beginning point. Where the work piece and the work engaging member are both moving, the beginning point and the end point of the reciprocating stroke may not be at the same location.

In producing the pattern of FIG. 15B, the work piece is simultaneously reciprocated and rotated with the periods of the reciprocation of the work engaging member and the reciprocation of the work carrying means being identical. The shape of the blade of the work engaging member produces the varying side pyramids illustrated in FIG. 15A. Other patterns capable of being produced by varying the various stroke placements, stroke lengths, period, and phases are illustrated in FIGS. 14A-B and 15B.

From the foregoing detailed description, it will be recognized that an apparatus particularly suitable for producing an infinite variety of patterns in a work piece has been described and illustrated. Preferably, the gear ratios will be chosen such that the pattern will have a common beginning and ending point during its cycle.

Such common beginning and ending point can be readily selected by determining the gear ratios in advance and in this case a 1:1 ratio would be chosen. The device is suited for mass producing profiled wooden objects having planar or curved surfaces. The patterns can be produced in two or three dimensional configurations and can be preselected prior to commencement of machine operation by selecting the proper phase, period, and stroke placements together with proper adjustment of the other machine variables, including the ratios between the various gears. Further, the apparatus is capable of being used in an automatic mode of operation or a manual mode of operation and can be easily maintained and operated.

Thus, although the present invention has been described with respect to its specific designs and techniques, it is not intended that such specific references should be considered as limitations upon the scope of the invention, rather, the invention should be defined by the appended claims and the equivalence thereof.

I claim:

1. A universal profiling apparatus having a work piece engaging member for producing a pattern upon contact with and movement of a work piece, said apparatus including:
   a frame;
   a work carrying means for supporting said work piece;
   means for carrying said work engaging member;
   first adjsutment means mounted on said frame for selectively moving and positioning said work carrying means, said first adjustment means including means for providing translation, rotation, tilt and elevation of said work carrying means relative to said frame;
   second adjustment means mounted on said frame for selectively moving and positioning said means for carrying said work engaging member, said second adjustment means including means for providing translation, orbital rotation and elevation of said work engaging means relative to said frame; and
   means for imparting relative movement between said work carrying means and said work engaging member along a preselected path while said work engaging member contacts said work piece, whereby portions of preselected designs can be produced in/on said work piece and whereby said first and second adjustment means provide an infinite number of selectable positional relationships between said work piece and said work engaging means along said preselected path thereby providing for an infinite choice of said preselected designs.

2. The apparatus of claim 1 wherein said means for carrying said work engaging member moves said work piece along a preselected axis with respect to said work engaging member, said work engaging member including means for positioning the center of a stroke of the work engaging member with respect to axis along which said work engaging member travels, one stroke of said work engaging member being the movement thereof from a beginning point to its maximum distance therefrom, and returning to its beginning point, said means for carrying said work engaging member including means for adjusting the length of the stroke of said work engaging member.

3. The apparatus of claim 1 including means for selectivley rotating said work carrying means, said means for selectively rotating said work carrying means including means for positioning the center of a stroke of said work carrying means with respect to the axis along which said work engaging member travels, one stroke of said work carrying means being the movement thereof from a beginning point to its maximum distance therefrom and returning to its beginning point.

4. The apparatus of claim 3 including means for adjusting the length of the stroke of said work carrying means.

5. The apparatus of claim 3 including drive means selectively connected with said means for rotating said work carrying means and said means for carrying said work engaging member for synchronously driving said means for rotating said work carrying means and said means for carrying said work engaging member.

6. The apparatus of claim 3 including drive means selectively connected with said means for rotating said work carrying means, said means for carrying said work engaging member along reciprocating path and said work carrying means for driving said means for rotating said work carrying means, said means for reciprocating said work engaging member and said means for reciprocating said work carrying means.

7. The apparatus of claim 6 including first connecting means for connecting said drive means with said means for reciprocating said work engaging member and second connecting means for connecting said drive means with said means for reciprocating said work carrying means and third connecting means for rotating said work carrying means, said drive means having a gear which serves as the power take off for driving each of said first, second and third connecting means.

8. The apparatus of claim 4 wherein said first connecting means and said second connecting means include means for positioning the center point of the strokes and means for controlling the length of the strokes of said reciprocating work engaging member and of said reciprocating work carrying means, respectively.

9. The apparatus of claim 6 including means for adjusting the phase of the movement of said work carrying means with respect to said work engaging means movement.

10. The apparatus of claim 1 whereby a preselected, repetitive pattern can be produced in/on said work piece in two and/or three dimensional configurations.

11. The apparatus of claim 3 including means for indexing the rotational movement of said work carrying means.

12. The profiling apparatus of claim 1 wherein said first adjustment means comprises:
    a platform fixedly secured to said frame;
    an undercarriage carried by said platform, said undercarriage provided with means for adjusting elevation of said undercarriage and with parallel slide ways;
    a carriage provided with bearings engaged with said ways, said carriage provided with means for moving said carriage along said ways; and
    a dividing head carried on said carriage having a base end attached to said carriage and a support platf6rm at a second end, said support platform carrying said work carrying means, said dividing head providing for selected rotation and selected tilt of said support platform.

13. The profiling apparatus of claim 12 wherein said carriage is provided with a circular recess in a face opposite said undercarriage, and further comprises a base plate received within said recess, said base end of said dividing head being attached to said base plate.

14. The profiling apparatus of claim 12 wherein said second adjustment means comprises:
   a second pair of parallel and substantially level slide ways attached to said frame, elevated above said work carrying means, and oriented at right angles to the orientation of said slide ways of said undercarriage;
   a second carriage slidably carried on said second pair of slide ways, said second carraige provided with means for selectively moving said second carriage along said second pair of slide ways for translation of said work engaging member, said second carriage provided with a second circular recess;
   a mounting plate, for mounting said work piece engaging member, rotatably received within said second circular recess, and means to rotate said mounting plate within said second recess for orbital rotation of said work engaging member.

15. The profiling apparatus of claim 14 wherein said second carriage has a first portion slidably carried on said second pair of slide ways, and a second portion pivotable, relative to said first portion, about a horizontal axis perpendicular to said second pair of slide ways, said second portion provided with said second recess, and wherein said mounting plate is provided with means to selectively position said work piece engaging member relative to an axis of rotation of said mounting plate, and further comprises means for pivoting said second portion of said second carriage about said horizontal axis and for selective elevation of said work piece engaging member relative to said mounting plate.

16. The profiling apparatus of claim 1 wherein said means for imparting relative movement comprises a rotating drive means, said drive means connected to said first and second adjustment means to provide selected actuation of the positioning means within said first and second adjustment means, said drive means including means for controlling speed and phase of said positioning means within said first and second adjustment means whereby said work engaging member automatically produces said preselected designs in/on said work piece.

17. The apparatus of claim 1 wherein said work piece engaging member comprises a router blade carried by a router whereby said router can be rotated for a circular pass relative to said work piece.

18. The apparatus of claim 17 wherein said work piece engaging member is provided with means whereby said router can make a straight line with a curve at the end of said line relative to said work piece.

19. The apparatus of claim 17 whereby said router can be moved by a drill press, said router being further provided with means to position said router in preselected positions along a 180 degrees plane relative to said work piece.

20. A universal profiling apparatus having a work piece engaging member for producing a pattern upon contact with and movement of said work engaging member relative to a work piece, said apparatus including:
   a frame;
   a work carrying means for supporting said work piece;
   a means for carrying said work engaging member;
   means for selectively rotating said work carrying means;
   means for positioning the center of a stroke of said work carrying means with respect to the axis along which said work engaging member travels, oen stroke of said work carrying means being the movement thereof from a beginning point to its maximum distance therefrom and returning to its beginning point;
   means for adjusting the tilt and the length of the stroke of said work carrying means;
   means for imparting relative movement between said work carrying means and said work engaging member along a preselected path while said work engaging member contacts said work piece, whereby portions of preselected designs can be produced in/on said work piece; and
   said means for imparting relative movement between said work carrying means and said work engaging member being provided with both manual means for operation of said apparatus in the manual mode of operation and automatic means for operation of said apparatus in the automatic mode of operation, whereby in said automatic mode of operation an infinite variety of preselected patterns can be employed for mass production of said work piece, said work piece having planar curved surfaces.

21. A universal profiling apparatus for producing a selected one of an unlimited number of design patterns in/on a work piece by a work engaging member of said apparatus, which comprises:
   a frame;
   a work carrying means supported on said frame by a first adjustment means, said first adjustment means comprising:
     a. a platform fixedly secured to said frame,
     b. an undercarriqge carried by said platform, said undercarriage provided with a first pair of parallel slide ways and with means for adjusting elevation of said undercarriage,
     c. a carriage provided with bearings engaged with said slide ways, with means for controllably moving said carriage along said slide ways for translation of said work carrying means, and with a circular recess in a surface opposite said undercarriage,
     d. a base plate rotatably received within said recess in said carriage, said base plate provided with means to selectively fix said base plate at a selected rotational position within said recess, and
     e. a dividing head carried on said carriage having a base end attached to said base plate, and a second end attached to said work carrying means, said dividing head adapted for selected rotation and selected tilt of said work carrying means;
   means for carrying said work engaging member supported on said frame by a second adjustment means, said second adjustment means comprising:
     a. a second pair of parallel slide ways adjustably supported from said frame above said work carrying means, said second pair of slide ways being substantially horizontal and oriented at right angles to said first pair of slide ways,
     b. a second carriage slidably carried on said second pair of slide ways, said second carriage provided with means for selectively moving said second carriage along said second pair of slide ways for translation of said work engaging member, said second carriage having a first portion carried by said second pair of slide ways and with a second portion pivotally mounted from said first portion with a pivot having an axis perpendicular to said second pair of slide ways, said second portion provided with a second circular recess, c. means attached between said first portion and said second portion of said second carriage for selectively tilfing said second portion with respect to said first portion about said pivot, d. a mounting plate, for mounting said work engaging member, rotatably received within said second circular recess, and e. means attached to said mounting plate and to said second portion of said second carriage to selectively rotate said mounting plate, and means for imparting relative movement between said work carrying means and said work engaging member, along a preselected path, while said work engaging member contacts said work piece whereby portions of preselected design patterns can be produced in/on said work piece and whereby said first and second adjustment means provide an infinite number of selectable positional relationships between said work piece and said work engaging member along said preselected path thereby providing for an infinite choice of said preselected design patterns.

* * * * *